United States Patent
Brief et al.

(10) Patent No.: US 11,086,852 B2
(45) Date of Patent: Aug. 10, 2021

(54) HARDWARE-ASSISTED MULTI-TABLE DATABASE WITH SHARED MEMORY FOOTPRINT

(71) Applicant: Western Digital Technologies, Inc., San Jose, CA (US)

(72) Inventors: David Brief, Modiin (IL); Yoav Markus, Tel Aviv (IL); Yuval Grossman, Kiryat Ono (IL)

(73) Assignee: Western Digital Technologies, Inc., San Jose, CA (US)

( * ) Notice: Subject to any disclaimer, the term of this patent is extended or adjusted under 35 U.S.C. 154(b) by 215 days.

(21) Appl. No.: 16/455,661

(22) Filed: Jun. 27, 2019

(65) Prior Publication Data
US 2020/0104295 A1    Apr. 2, 2020

Related U.S. Application Data

(60) Provisional application No. 62/739,156, filed on Sep. 28, 2018.

(51) Int. Cl.
    *G06F 16/23*    (2019.01)
    *G06F 16/22*    (2019.01)
(52) U.S. Cl.
    CPC ...... *G06F 16/2379* (2019.01); *G06F 16/2282* (2019.01)
(58) Field of Classification Search
    CPC .................. G06F 16/2379; G06F 16/2282
    See application file for complete search history.

(56) References Cited

U.S. PATENT DOCUMENTS

| | | | |
|---|---|---|---|
| 5,210,870 A | 5/1993 | Baum et al. | |
| 5,590,362 A | 12/1996 | Baum et al. | |
| 5,870,739 A | 2/1999 | Davis, III et al. | |
| 6,557,015 B1 * | 4/2003 | Bates | G06F 16/955 715/229 |
| 9,251,218 B2 | 2/2016 | Asaad et al. | |
| 2004/0172400 A1 | 9/2004 | Zarom et al. | |
| 2008/0189252 A1 | 8/2008 | Branscome et al. | |

(Continued)

OTHER PUBLICATIONS

Funke et al., "Compacting Transactional Data in Hybrid OLTP & OLAP Databases," Proceedings of the VLDB Endowment, 2012, vol. 5, No. 11, pp. 1424-1435.

*Primary Examiner* — Albert M Phillips, III
(74) *Attorney, Agent, or Firm* — Morgan, Lewis & Bockius LLP

(57) ABSTRACT

Disclosed are systems and methods for providing an improved hardware-assisted multi-table database with reduced memory footprint. A method includes receiving a request to perform an operation on a selected logical table of a plurality of logical database tables. The method also includes accessing a data structure comprising a plurality of records each including: a logical table identifier corresponding to one of the plurality of logical database tables, wherein the logical table identifier is accessed from a register, and at least one sort key. The method also includes performing the operation using one or more sort criteria, wherein the one or more sort criteria are maintained for the selected logical table using the at least one sort key of the plurality of records corresponding to the selected logical table. The method also includes updating the data structure to reflect the performed operation.

20 Claims, 5 Drawing Sheets

(56) References Cited

U.S. PATENT DOCUMENTS

| | | |
|---|---|---|
| 2008/0222397 A1 | 9/2008 | Wilkerson et al. |
| 2012/0047126 A1 | 2/2012 | Branscome et al. |
| 2013/0073513 A1 | 3/2013 | Kemper et al. |
| 2015/0324283 A1 | 11/2015 | Lai |
| 2019/0205459 A1* | 7/2019 | Busjaeger ............... G06F 16/27 |

* cited by examiner

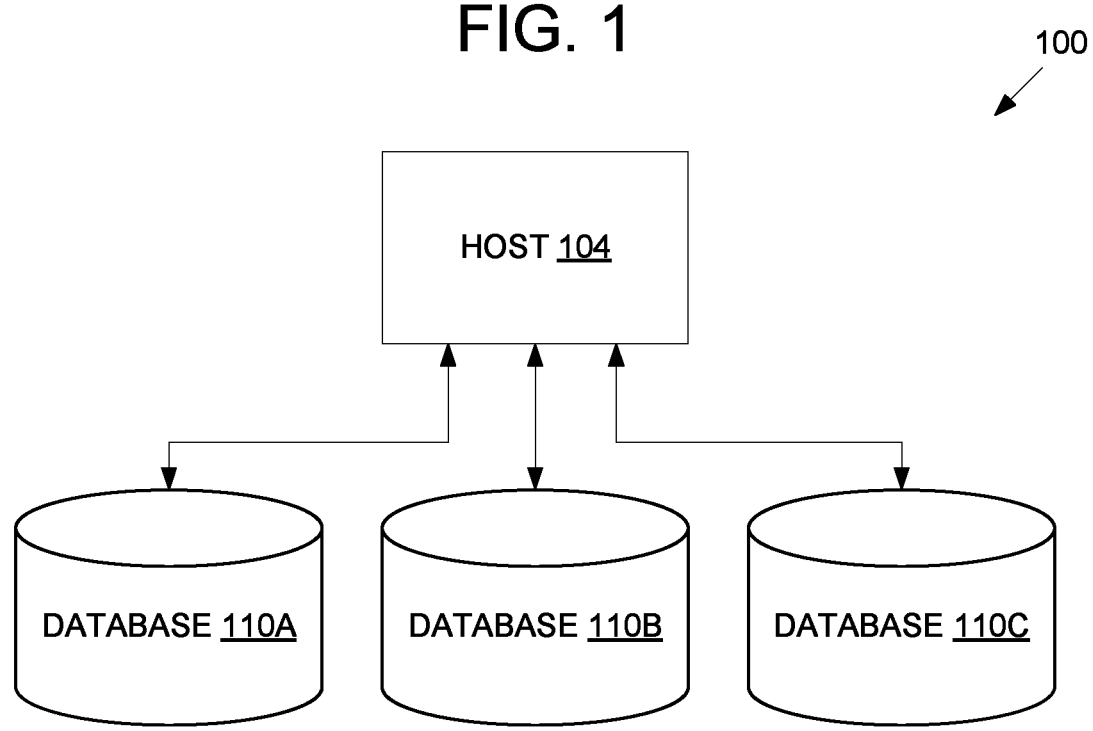

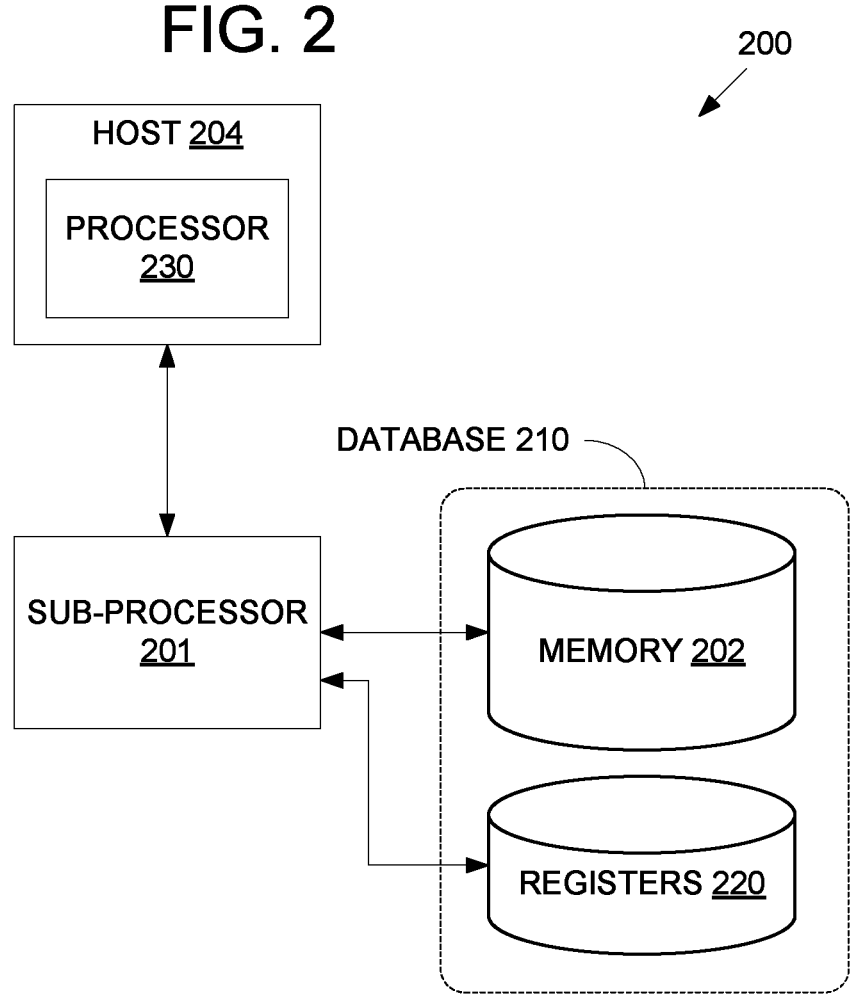

| RecordID | TableID | SortKey1 | ExtraInfo |
|---|---|---|---|
| 0 | 1 | 0x5000 | aaaaaaaa |
| 1 | 1 | 0x5001 | bbbbbbbb |
| 2 | 2 | 0x3500 | 11111111 |
| 3 | 2 | 0x3508 | 22222222 |
| 4 | 1 | 0x5002 | cccccccc |
| 5 | 3 | 0xFFFE | 1.1111111 |
| 6 | 3 | 0xFFFF | 2.2222222 |
| 7 | 3 | 0x0000 | 3.3333333 |
| Max_Records_Used → 8 | 0 | 0x0000 | 00000000 |
| 9 | 0 | 0x0000 | 00000000 |
| 10 | 0 | 0x0000 | 00000000 |
| 11 | 0 | 0x0000 | 00000000 |
| ... | ... | ... | ... |
| 255 | 0 | 0x0000 | 00000000 |

Store in Registers 220 | Store in Memory 202 at BaseAddress

KeyOffset → | Keysize |

| RecordSize |

| TableID | Sort_1 | Sort_2 |
|---|---|---|
| 1 | Min_RecID = 0 | Max_RecID = 4 |
| 2 | Min_RecID = 2 | Max_RecID = 3 |
| 3 | Min_RecID = 5 | Max_RecID = 7 |

HARDWARE-ASSISTED MULTI-TABLE DATABASE WITH SHARED MEMORY FOOTPRINT

CROSS REFERENCE TO RELATED APPLICATIONS

This application claims the benefit of U.S. Application Ser. No. 62/739,156, entitled "HARDWARE-ASSISTED MULTI-TABLE DATABASE WITH SHARED MEMORY FOOTPRINT," filed on Sep. 28, 2018, the entirety of which is incorporated herein by reference.

BACKGROUND

Modern applications may require high-speed, low latency access to several different databases. One approach to improving the performance of such databases is to use high performance storage tiers, such as random access memory (RAM) with registers and flash memory. As applications continue to process more demanding workloads for high performance computing (HPC), machine learning, and embedded applications such as flash translation layers (FTLs) for storage devices, each database also requires appropriately larger sized allocations within the high performance storage tiers, increasing fabrication and operational costs for device manufacturers and end users. Thus, there is a need to provide an efficient way to provide optimal performance for high performance databases with a minimal resource footprint.

The description provided in the background section should not be assumed to be prior art merely because it is mentioned in or associated with the background section. The background section may include information that describes one or more aspects of the subject technology.

BRIEF DESCRIPTION OF THE DRAWINGS

A detailed description will be made with reference to the accompanying drawings:

FIG. 1 illustrates an example system for accessing multiple databases.

FIG. 2 illustrates an example hardware-assisted multi-table database system.

FIG. 3A and FIG. 3B illustrate an example record table and an example sort criteria table for use with a hardware-assisted multi-table database system.

DETAILED DESCRIPTION

Figure 4:
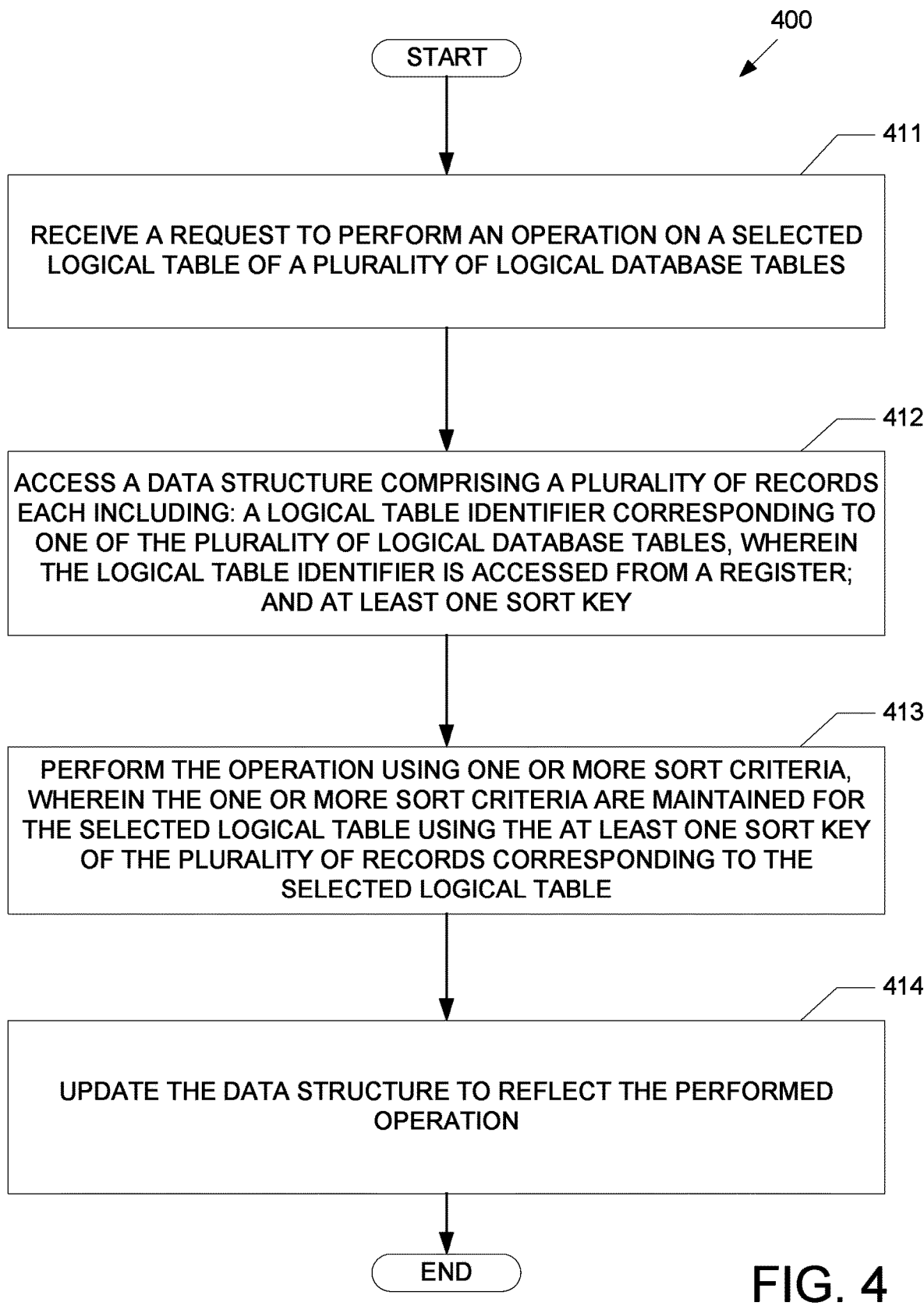
FIG. 4 is a flowchart illustrating an example method for processing a database operation using a hardware-assisted multi-table database system.

The detailed description set forth below is intended as a description of various configurations of the subject technology and is not intended to represent the only configuration in which the subject technology may be practiced. The appended drawings are incorporated herein and constitute a part of the detailed description. The detailed description includes specific details for the purpose of providing a thorough understanding of the subject technology. However, the subject technology may be practiced without these specific details. In some instances, structures and components are shown in block diagram form in order to avoid obscuring the concepts of the subject technology. Like components are labeled with identical element numbers for ease of understanding.

The present description relates in general to data storage systems, and more particularly to, for example, without limitation, providing a hardware-assisted multi-table database with a shared memory footprint. Conventionally, multiple databases may be stored and accessed as separate databases or tables that are stored in respective separate data structures. However, this approach may require each separate database to account for a worst-case database size to avoid memory pressure that may force paging to a slower storage tier. This worst-case database size in turn requires larger amounts of space to be reserved in high performance storage tiers, which can quickly become cost prohibitive.

One or more implementations of methods and systems are provided for an improved hardware-assisted multi-table database with reduced memory footprint, e.g., to provide unified access to multiple logical databases or tables, where the hardware-assisted multi-table database may employ a register-indexed multi-table database. Instead of storing each database separately, a unified data structure enables access to multiple logical tables for multiple databases. By storing logical table identifiers within a first tier of high speed memory, such as in registers, operations directed to a specific database or logical table can be quickly filtered to relevant records in the data structure. Other data fields, such as sort keys and extra metadata, can be stored in a second tier of high-speed memory, such as random access memory (RAM). Since the multiple databases can use a shared memory pool, targeting an average-case database size may meet the storage space and performance requirements of each of the databases, rather than requiring a worst-case database size for separate databases. This allows reduction in memory size (or memory footprint).

To simplify database operations and to provide high performance, the hardware-assisted multi-table database may abide by several rules. One rule may specify that records and fields in the data structure use fixed sizes to simplify indexed access. Another rule may maintain one or more sort criteria based on the sort keys for each of the logical databases to accelerate access to the next most likely requested record for the next database operation. For example, the sort criteria may be updated as database operations are performed, allowing a relevant record to be accessed directly using the sort criteria instead of performing a scan or search of the data structure. Example sort criteria may include a maximum record, a minimum record, a least frequently used record, or a least recently used record. Another rule may delete records in-place by setting the logical table identifier to a predetermined null value, thereby bypassing resorting overhead. A "stack pointer" may also be maintained for positioning new records within the data structure.

One or more implementations of the subject technology provide several performance benefits that improve the functionality of a computer. As discussed above, by storing the logical table identifiers in a first tier of high-speed memory such as registers that are locally accessible, filtering an operation to relevant database records can occur quickly without incurring input/output (I/O) overhead by transmission over a data bus. Further, by combining logical tables for several databases in a single data structure, less storage space may be required to provide sufficient performance for the databases, reducing hardware requirements and costs of manufacture and operation. Yet further, since the results using a pre-selected sort criteria are maintained for each database as operations occur, in one or more implementations, the records of interest for each individual database can be quickly and immediately accessed without scan operations, linked list operations, or record reordering. Yet further, when fixed sized records and fields are used, record and field offsets can be calculated directly using formulas or look-up tables.

FIG. 1 illustrates an example system 100 for accessing multiple databases. System 100 includes host 104, database 110A, database 110B, and database 110C.

As shown in system 100, one approach to providing access to multiple databases for host 104 is to provide separate databases 110A-110C that are stored in separate locations. However, as discussed above, maintaining high performance for database 110A, 110B, and 110C may require each database 110A-110C to allocate large amounts of high-speed storage tiers to handle worst-case data set sizes. Since the manufacture and operational costs of high-speed, high performance storage tiers may be quite burdensome, the architecture of system 100 may not be feasibly budgeted for many applications.

FIG. 2 illustrates an example system 200 for providing a hardware-assisted multi-table database system. System 200 includes host 204, database 210, and sub-processor 201. Host 204 includes processor 230. Database 210 includes memory 202 and registers 220.

As shown in system 200, host 204 accesses a single database 210, rather than the multiple separate databases 110A-110C of system 100. Further, sub-processor 201 enables processor 230 to offload processing duties for database 210. As shown in database 210, storage is organized into at least two tiers: a first tier of high-speed storage, or registers 220, and a second tier of storage, or memory 202. For example, sub-processor 201 may access registers 220 locally, whereas access to memory 202 may require communication over a data bus. In some aspects of the present technology, sub-processor 201, memory 202, and registers 220 may be fabricated integrally on a single package or die, which may be an application specific integrated circuit (ASIC). Database 210 may include multiple logical tables corresponding to separate databases, such as databases 110A-110C of FIG. 1.

FIG. 3A and FIG. 3B illustrate an example record table 310 and an example sort criteria table 340 for use with system 200. Record table 310 includes the fields "TableID", "SortKey1", and "ExtraInfo", with records indexed by a "RecordID". As indicated in FIG. 3A, the TableID field may be stored in registers 220, whereas the remaining fields including SortKey1 and ExtraInfo may be stored in memory 202. Record table 310 may also include additional fields that are not specifically shown in FIG. 3A. For example, multiple SortKeys may be stored. In the example shown in FIG. 3A, record table 310 can hold a maximum of 256 records, but any number of records may be supported according to available hardware resources.

The RecordID may correspond to an index that identifies a particular record in record table 310, and thus may not be actually stored in record table 310. Fixed size records and fixed size fields may be used to simplify access to records and fields in record table 310. For example, assuming that RecordSize is a fixed size and that Keysize and KeyOffset are also fixed sizes, the offset for accessing an ExtraInfo field in memory 202 for a given RecordID=i can be determined using Formula 1 below:

$$\text{offset}=\text{BaseAddress}+(\text{RecordSize}*i)+\text{KeyOffset}+\text{Keysize} \quad \text{Formula 1:}$$

Similar formulas may be used to access fields other than ExtraInfo. Note that in FIG. 3A, KeyOffset may be equal to zero, since there may be no fields prior to the SortKey1 field other than the TableID field, which is stored in registers 220 rather than memory 202. Further, rather than using Formula 1 to calculate the offset for each look-up, a pre-calculated look-up table or another method may be used. A look-up table may also support variable sized records and fields.

The TableID field may identify a particular logical table associated with the record. For example, TableID 1 may be associated with a logical database table corresponding to database 110A, TableID 2 may be associated with a logical database table corresponding to database 110B, and TableID 3 may be associated with a logical database table corresponding to database 110C. A particular TableID may be reserved as a predetermined null value, for example TableID 0, which may indicate that the record is empty and not associated with any logical database table.

Note that in the example shown in record table 310, the range of possible values for TableID is 0 to 3, which is representable using 2 bits. Assuming registers 220 contains 64-bit word size registers, the TableID field for 64/2=32 records can be stored in a single 64-bit register of registers 220. Thus, storing the TableID for all 256 records of record table 310 may only require 256/32=8 registers. Of course, the number of registers required in registers 220 may vary depending on the number of logical tables, the maximum records supported by record table 310, and the word size of the registers.

The SortKey1 field enables the records to be sorted by one or more criteria, and may be derived from one or more values. While the example shown in FIG. 3A shows SortKey1 to be a 16-bit integer value for all three logical tables, the SortKey1 data type may be different for each logical table, and multiple sort keys may also be supported. When SortKey1 is a fixed size field, SortKey1 may be sized to fit the largest possible sort key data type for all the logical tables.

In some aspects of the subject technology, SortKey1 may be a cyclical counter, wherein adjacent record entries do not exceed a distance more than half of the maximum size of the data type. For example, assuming SortKey1 is a 16-bit integer data type, adjacent record entries may have a distance equal to or less than 0x8000, or 32768. Otherwise, if the distance between record entries meets or exceeds half the maximum size, then the sort key may be determined to have looped or cycled back to an initial value. For example, from RecordID 6 to RecordID 7, the distance between the SortKey1 values is 0xFFFF, which exceeds 0x8000, indicating that a cycling occurred. Thus, SortKey1 of RecordID 7 (0x0000) may be determined to be larger than SortKey1 of RecordID6 (0xFFFF).

The ExtraInfo field may contain data or metadata regarding the associated record. Further, the data type for the ExtraInfo field may differ between logical tables. For example, the logical table associated with TableID 1 may use strings for ExtraInfo, the logical table associated with TableID 2 may use integers for ExtraInfo, and the logical table associated with TableID 3 may use floating-point numbers for ExtraInfo. Further, while record table 310 only depicts a single ExtraInfo field, some aspects of the present technology may include multiple data or metadata fields for each record. In yet other aspects of the present technology, the ExtraInfo field may include a primary key or another identifier for retrieving an associated record in another storage tier, such as on mass storage disk arrays.

Additionally, one or more pointers or indexes may be maintained for record table 310 to simplify record deletions and insertions. For example, the "Max_Records_Used" index may be used as a "stack pointer" that points to the next empty record for insertions into record table 310. The "Max_Records_Used" index may also be used to truncate scans and searches of record table 310.

Sort criteria table 340 of FIG. 3B depicts sort criteria for each of the logical tables, or the logical tables identified by TableID 1, 2, and 3. As shown in sort criteria table 340, two sort criteria are maintained for each logical table, or a "Min_RecID" and a "Max_RecID". These may correspond to the RecordID having the minimum SortKey1 and the maximum SortKey1 value for each respective TableID. Thus, for the logical table associated with TableID 1, the Min_RecID=0 (SortKey1=0x5000) and the Max_RecID=4 (SortKey1=0x5002). For the logical table associated with TableID 2, the Min_RecID=2 (SortKey1=0x3500) and the Max_RecID=3 (SortKey1=0x3508). For the logical table associated with TableID 3, the Min_RecID=5 (SortKey1=0xFFFE) and the Max_RecID=7 (SortKey1=0x0000). As discussed above, for TableID 3, 0x0000 may be determined to be a higher sort value than 0xFFFE due to SortKey1 being a cyclical counter.

Note that while sort criteria table 340 shows a minimum record and a maximum record maintained for each logical table, the sort criteria for each logical table may differ. For example, other sort criteria such as a least recently used record and a least frequently used record may be used, wherein SortKey1 represents an access time or access frequency, respectively. Sort criteria table 340 may be updated in response to a database operation, such as a record insertion or deletion. As a result, in one or more implementations, answers to queries according to different sort criteria for each logical table or database can be retrieved immediately, for example by using the Pop( ) API call discussed below.

Further, the number of sort criteria may differ for each logical table. For example, sort criteria table 340 may maintain a minimum record for a first logical table, both a minimum and maximum record for a second logical table, and a least frequently accessed record for a third logical table. Thus, flexible sort criteria can be maintained for each logical table.

Even further, sort criteria table 340 may also maintain the best N matches for each sort criteria, rather than only a single best match. For example, if N=3, the minimum, second to minimum, third to minimum records and the maximum, second to maximum, and third to maximum records may be maintained for each logical table in sort criteria table 340. A register or other data store may keep track of the valid number of matches for each logical table.

FIG. 4 is a flowchart illustrating an example method 400 for processing a database operation using a hardware-assisted multi-table database system. One or more blocks of FIG. 4 may be executed by a computing system (including, e.g., a controller of a flash memory, a data storage controller of a data storage system or a solid state storage device (SSD), a processor, or the like). Examples of a computing system or a controller may be controller 501 and/or 507. Similarly, a non-transitory machine-readable medium may include machine-executable instructions thereon that, when executed by a computer or machine, perform the blocks of FIG. 4. The steps of process 400 may be implemented as hardware/firmware or software.

Figure 5:
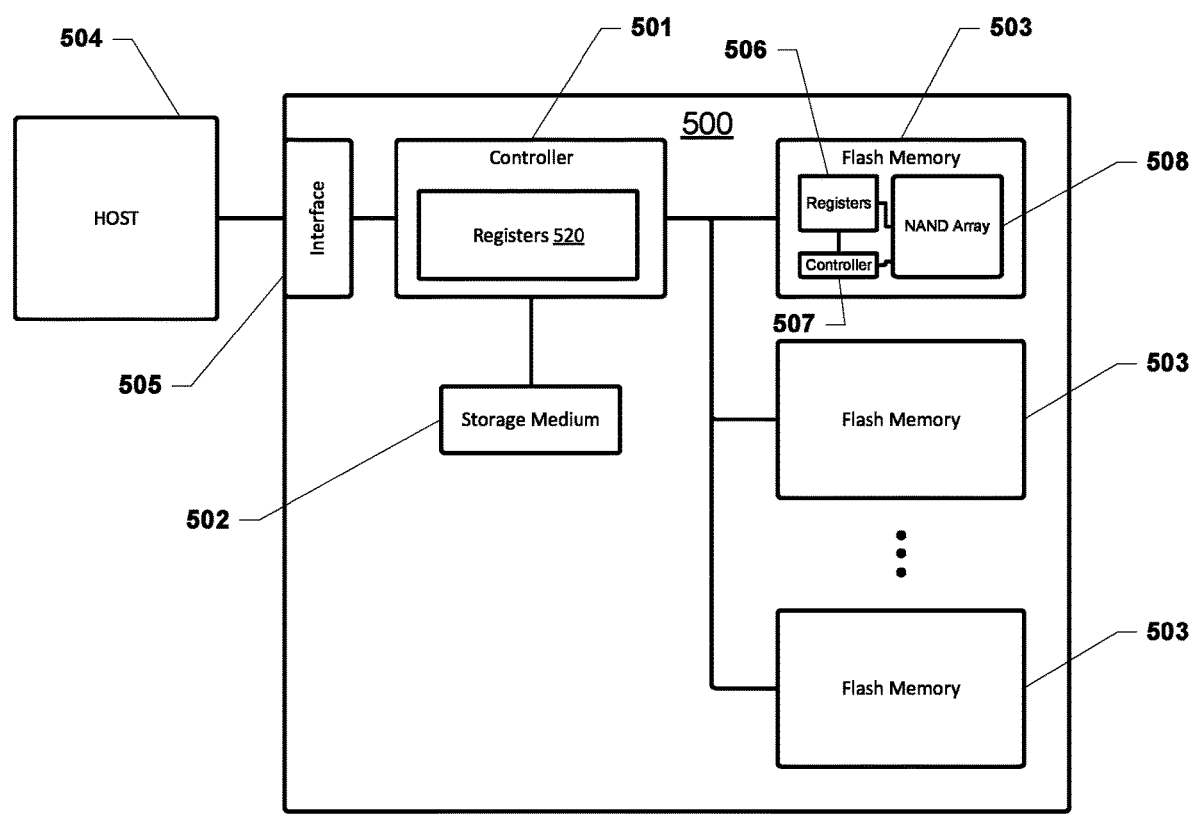
FIG. 5 is a block diagram illustrating components of an example data storage system.

In block 411, referring to FIG. 5, controller 501 receives a request to perform an operation on a selected logical table of a plurality of logical database tables. For example, controller 501 may receive a request from an application of controller 501 to read or write a record in a selected logical table, or an application of host 504 may send a request to controller 501. Controller 501 may receive requests using an API from application software or firmware. While process 400 is described with controller 501, controller 507 may also perform process 400. The following API commands may be supported:

Command 1: Push(TableID, RecordID, SortKey1, [SortKey2 . . . ])

Referring to FIG. 3A, the Push command writes a record to the specified RecordID with the specified fields, including TableID, SortKey1, etc. Note that while the example API command specifies the TableID directly, in other aspects of the present technology, a "Table Name" may be specified, which is determined to match a corresponding TableID. As part of the Push command, an UpdateTable operation may commence to perform an update of sort criteria table 340. The sort criteria for the associated TableID in sort criteria table 340 are compared against the specified SortKeys from the Push command, and the sort criteria in sort criteria table 340 are updated when the specified SortKeys provide a better match for the specified sort criteria, or minimum and maximum records in the example shown in FIG. 3B. As discussed above, the best N matches may also be maintained in sort criteria table 340. The UpdateTable operation may be a blocking operation wherein no other database operations may be performed until the UpdateTable operation completes.

Command 2: Pop(TableID)

Referring to FIG. 3A and FIG. 3B, the Pop command retrieves records from record table 310 according to the sort criteria for the specified TableID in sort criteria table 340. The associated records may also be deleted from record table 310. In some aspects of the present technology, the TableID of the associated record may be set to a predetermined null value, such as 0, to delete the record, rather than reordering record table 310. The deletion may trigger an UpdateTable operation as described above, which may further perform a scan of record table 310 to determine updated best matches according to the defined sort criteria in sort criteria table 340. As discussed above, registers or other data stores may be used to track valid matches for each sort criterion.

Command 3: Peek(TableID)

Referring to FIG. 3A and FIG. 3B, the Peek command may retrieve the same records as the Pop command, but may skip deleting the associated records from record table 310.

Command 4: PushAll(List of records)

The PushAll command may correspond to the Push command, but for multiple records and possibly to multiple logical tables.

Command 5: TotalEntries( )

The TotalEntries( ) command may scan record table 310 for valid entries and return a count of valid entries. For example, TotalEntries( ) on record table 310 as shown in FIG. 3A would return the value "8".

Command 6: TotalPush( )

The TotalPush( )command may return a count of Push( ) commands performed, which may be reset after each TotalPush( )command.

Command 7: TotalPops( )

The TotalPops( ) command may return a count of Pop( ) commands performed, which may be reset after each TotalPops( ) command.

In block 412, referring to FIG. 5, controller 501 accesses record table 310. For example, assuming that the requested operation from block 411 corresponds to the API call Pop(3), then the minimum record and maximum record for the logical table identified by TableID 3 is to be retrieved from record table 310.

In block 413, referring to FIG. 5, controller 501 performs the operation using one or more sort criteria from sort criteria table 340. Since the request is for the logical table associated with TableID 3, the associated record, or the third record in sort criteria table 340 can be accessed to retrieve Min_RecID=5 from Sort_1 and Max_RecID=7 from Sort_2. Accordingly, the records at index RecordID 5 and RecordID 7 from record table 310 may be retrieved as the minimum and maximum records, respectively. Note that the records and individual fields can be accessed directly without performing a scan of record table 310, for example by using calculations similar to Formula 1 above or a look-up table.

In block 414, referring to FIG. 5, controller 501 updates record table 310 to reflect the performed operation. Since the operation is a Pop operation, the records associated with RecordID 5 and RecordID 7 may be deleted, for example by setting the TableID field to 0. Further, as indicated in block 413, the sort criteria for the selected logical table (TableID 3) may be maintained by using the UpdateTable operation described above to update sort criteria table 340. A scan of record table 310 may be performed to determine the updated sort criteria, which may correspond to Sort_1 with Min_RecID=6 and Sort_2 with Max_RecID=6. These updated values may be written into the third record of sort criteria table 340. As discussed above, since the TableID field of record table 310 is stored in locally accessible registers 220, the records associated with TableID 3 can be filtered quickly without communicating over a data bus. Thus, scans of record table 310 can proceed in an accelerated manner when database operations are specified for no more than a single logical table, as with the Push and Pop API commands described above.

FIG. 5 is a block diagram illustrating components of an example data storage system, according to aspects of the subject technology. As depicted in FIG. 5, in some aspects, data storage system 500 (e.g., a solid state drive) includes data storage controller 501, storage medium 502, and flash memory array 510 including one or more flash memory 503. Controller 501 may use storage medium 502 for temporary storage of data and information used to manage data storage system 500. Controller 501 may include registers 520, and controller 501 may also include several internal components (not shown) such as a read-only memory, a flash component interface (e.g., a multiplexer to manage instruction and data transport along a serial connection to flash memory 503), an I/O interface, error correction circuitry, and the like. In some aspects, all of these elements of controller 501 may be integrated into a single chip. In other aspects, these elements may be separated on their own PC board. For example, registers 520 may be separate from controller 501, and/or storage medium 502 may be integral with controller 501.

In some implementations, aspects of the subject disclosure may be implemented in data storage system 500. For example, aspects of the subject disclosure may be integrated with the function of data storage controller 501 or may be implemented as separate components for use in conjunction with data storage controller 501. Alternatively or additionally, aspects of the subject disclosure may be integrated with the function of controller 507 or may be implemented as separate components for use in conjunction with controller 507. Registers 506 and random access memory may be integral to controller 507, separate from controller 507, or a combination thereof.

Referring to FIG. 2 and FIG. 5, host 204 may correspond to host 504, sub-processor 201 may correspond to controller 501, controller 507, or a combination thereof, memory 202 may correspond to storage medium 502, a random access memory of controller 507, or a combination thereof, and registers 220 may correspond to registers 520, registers 506, or a combination thereof.

Controller 501 may also include a processor that may be configured to execute code or instructions to perform the operations and functionality described herein, manage request flow and address mappings, and to perform calculations and generate commands. The processor of controller 501 may be configured to monitor and/or control the operation of the components in data storage controller 501. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on ROM within controller 501 and/or its processor. One or more sequences of instructions may be software stored and read from storage medium 502, flash memory 503, or received from host device 504 (e.g., via host interface 505). ROM, storage medium 502, flash memory 503, represent examples of machine or computer readable media on which instructions/code executable by controller 501 and/or its processor may be stored. Machine or computer readable media may generally refer to any medium or media used to provide instructions to controller 501 and/or its processor, including volatile media, such as dynamic memory used for storage media 502 or for buffers within controller 501, and non-volatile media, such as electronic media, optical media, and magnetic media.

In some aspects, controller 501 may be configured to store data received from a host device 504 in flash memory 503 in response to a write command from host device 504. Controller 501 is further configured to read data stored in flash memory 503 and to transfer the read data to host device 504 in response to a read command from host device 504.

Host device 504 represents any device configured to be coupled to data storage system 500 and to store data in data storage system 500. Host device 504 may be a computing system such as a personal computer, a server, a workstation, a laptop computer, PDA, smart phone, and the like. Alternatively, host device 504 may be an electronic device such as a digital camera, a digital audio player, a digital video recorder, and the like.

In some aspects, storage medium 502 represents volatile memory used to temporarily store data and information used to manage data storage system 500. According to aspects of the subject technology, storage medium 502 is random access memory (RAM) such as double data rate (DDR) RAM. Other types of RAM also may be used to implement storage medium 502. Memory 502 may be implemented using a single RAM module or multiple RAM modules. While storage medium 502 is depicted as being distinct from controller 501, those skilled in the art will recognize that storage medium 502 may be incorporated into controller 501 without departing from the scope of the subject technology. Alternatively, storage medium 502 may be a non-volatile memory such as a magnetic disk, flash memory, peripheral SSD, and the like.

As further depicted in FIG. 5, data storage system 500 may also include host interface 505. Host interface 505 may be configured to be operably coupled (e.g., by wired or wireless connection) to host device 504, to receive data from host device 504 and to send data to host device 504. Host interface 505 may include electrical and physical connections, or a wireless connection, for operably coupling host device 504 to controller 501 (e.g., via the I/O interface of controller 501). Host interface 505 may be configured to communicate data, addresses, and control signals between host device 504 and controller 501. Alternatively, the I/O interface of controller 501 may include and/or be combined with host interface 505. Host interface 505 may be configured to implement a standard interface, such as Universal Flash Storage (UFS), Serial-Attached SCSI (SAS), Fiber Channel interface, PCI Express (PCIe), SATA, USB, and the like. Host interface 505 may be configured to implement only one interface. Alternatively, host interface 505 (and/or the I/O interface of controller 501) may be configured to implement multiple interfaces, which may be individually selectable using a configuration parameter selected by a user or programmed at the time of assembly. Host interface 505 may include one or more buffers for buffering transmissions between host device 504 and controller 501.

Flash memory 503 represents a non-volatile memory device for storing data. According to aspects of the subject technology, flash memory 503 includes, for example, a NAND flash memory. Flash memory 503 may include a single flash memory device or chip, or, as depicted by FIG. 5, may include multiple flash memory devices or chips arranged in multiple channels. Flash memory 503 is not limited to any particular capacity or configuration. For example, the number of physical blocks, the number of physical pages per physical block, the number of sectors per physical page, and the size of the sectors may vary within the scope of the subject technology.

Flash memory may have a standard interface specification so that chips from multiple manufacturers can be used interchangeably (at least to a large degree). The interface hides the inner working of the flash and returns only internally detected bit values for data. In aspects, the interface of flash memory 503 is used to access one or more internal registers 506 and an internal flash controller 507 for communication by external devices. In some aspects, registers 506 may include address, command, and/or data registers, which internally retrieve and output the necessary data to and from a NAND memory cell array 508. For example, a data register may include data to be stored in memory array 508, or data after a fetch from memory array 508, and may also be used for temporary data storage and/or act like a buffer. An address register may store the memory address from which data will be fetched to host 504 or the address to which data will be sent and stored. In some aspects, a command register is included to control parity, interrupt control, and the like. In some aspects, internal flash controller 507 is accessible via a control register to control the general behavior of flash memory 503. Internal flash controller 507 and/or the control register may control the number of stop bits, word length, receiver clock source, and may also control switching the addressing mode, paging control, coprocessor control, and the like.

In some aspects, registers 506 may also include a test register. The test register may be accessed by specific addresses and/or data combinations provided at the interface of flash memory 503 (e.g., by specialized software provided by the manufacturer to perform various tests on the internal components of the flash memory). In further aspects, the test register may be used to access and/or modify other internal registers, for example the command and/or control registers. In some aspects, test modes accessible via the test register may be used to input or modify certain programming conditions of flash memory 503 (e.g., read levels) to dynamically vary how data is read from the memory cells of memory arrays 508. Registers 506 may also include one or more data latches coupled to flash memory 503.

It should be understood that in all cases data may not always be the result of a command received from host 504 and/or returned to host 504. In some aspects, Controller 501 may be configured to execute a read operation independent of host 504 (e.g., to verify read levels or BER). The predicate words "configured to", "operable to", and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Controller 507 may perform the operations identified in blocks 411-414. Controller 507 may cause the operations identified in blocks 411-414 to occur, or controller 501 may provide instructions to cause or facilitate controller 507 (and registers 506) to perform operations identified in blocks 411-414.

Various examples of aspects of the disclosure are described below. These are provided as examples, and do not limit the subject technology.

One or more aspects of the subject technology provide methods for providing an improved hardware-assisted multi-table database with reduced memory footprint. According to some aspects, a method may include receiving a request to perform an operation on a selected logical table of a plurality of logical database tables. The method may also include accessing a data structure comprising a plurality of records each including: a logical table identifier corresponding to one of the plurality of logical database tables, wherein the logical table identifier is accessed from a register; and at least one sort key. The method may also include performing the operation using one or more sort criteria, wherein the one or more sort criteria are maintained for the selected logical table using the at least one sort key of the plurality of records corresponding to the selected logical table. The method may also include updating the data structure to reflect the performed operation.

In other aspects, a data storage device may include registers and a controller. The controller may be configured to receive a request to perform an operation on a determined logical table of a plurality of logical database tables. The controller may also be configured to access a data structure comprising a plurality of records each including: a logical table identifier corresponding to one of the plurality of logical database tables, wherein the logical table identifier is stored in the registers; and at least one sort key. The controller may also be configured to perform the operation using one or more sort criteria, wherein the one or more sort criteria are maintained for the determined logical table using the at least one sort key of the plurality of records corresponding to the determined logical table.

In further aspects, a system may include means for receiving a request to perform an operation. The system may further include means for selecting a logical table of a plurality of logical database tables for servicing the request.

The system may further include means for accessing a data structure comprising a plurality of records each including: a logical table identifier corresponding to one of the plurality of logical database tables, wherein the logical table identifier is accessed from a register; and at least one sort key. The system may further include means for performing the operation using one or more sort criteria, wherein the one or more sort criteria are maintained for the selected logical table using the at least one sort key of the plurality of records corresponding to the selected logical table.

In further aspects, a non-transitory machine-readable medium may include machine-executable instructions thereon that, when executed by a processor, perform a method. The method may include receiving a request to perform an operation on a selected logical table of a plurality of logical database tables. The method may also include accessing a data structure comprising a plurality of records each including: a logical table identifier corresponding to one of the plurality of logical database tables, wherein the logical table identifier is accessed from a register; and at least one sort key. The method may also include performing the operation using one or more sort criteria, wherein the one or more sort criteria are maintained for the selected logical table using the at least one sort key of the plurality of records corresponding to the selected logical table, wherein the one or more sort criteria identify, based on the at least one sort key, at least one of: a maximum record, a minimum record, a least frequently used record, or a least recently used record. The method may also include updating the data structure to reflect the performed operation.

Various implementations of the methods and systems for providing an improved register indexed multi-table database with reduced memory footprint that provides several performance advantages that improve the functioning of a device, such as an embedded systems controller or an ASIC. A host computer that interfaces with the device is also provided with improved functioning by maintaining high application performance with multiple databases. Thus, the described methods and systems provide performance benefits that improve the functioning of a device and a host computer coupled to the device.

It is understood that other configurations of the subject technology will become readily apparent to those skilled in the art from the detailed description herein, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A machine-implemented method for providing a hardware-assisted multi-table database with shared memory footprint, the method comprising:
    receiving a request to perform an operation with respect to a selected logical table of a plurality of logical database tables;
    accessing a data structure comprising a first plurality of records each storing:
        a logical table identifier value corresponding to one of the plurality of logical database tables, wherein the logical table identifier value is accessed from a register; and
        at least one sort key value assigned to a respective logical table identifier value;
    performing the operation using one or more sort criteria values, wherein the one or more sort criteria values are maintained for the selected logical table using the at least one sort key value of the first plurality of records corresponding to the selected logical table; and
    updating the data structure to reflect the performed operation,
    wherein:
    the plurality of logical database tables correspond to multiple databases;
    the data structure is different from the plurality of logical database tables;
    the first plurality of records are different from the plurality of logical database tables;
    a second plurality of records store the one or more sort criteria values;
    the second plurality of records are different from the first plurality of records;
    the one or more sort criteria values in the second plurality of records are determined from the at least one sort key value in the first plurality of records;
    the one or more sort criteria values in the second plurality of records are different from the at least one sort key value in the first plurality of records;
    the one or more sort criteria values in the second plurality of records comprise one or more of record identifier values;
    each record in the first plurality of records is identified by a respective record identifier value;
    the record identifier values are sequential; and
    the first plurality of records are indexed by the record identifier values.

2. The method of claim 1, wherein the at least one sort key value is accessed in a memory.

3. The method of claim 2, wherein the first plurality of records each includes extra metadata accessed in the memory.

4. The method of claim 1, wherein the first plurality of records are stored in a single shared table.

5. The method of claim 1, wherein the at least one sort key value comprises different types for at least two of the plurality of logical database tables.

6. The method of claim 1, wherein performing the operation accesses a target record of the first plurality of records using the one or more sort criteria values.

7. The method of claim 6, wherein performing the operation does not perform a scan of the data structure.

8. The method of claim 6, wherein the operation comprises popping the target record, and wherein updating the data structure includes setting the logical table identifier value of the target record to a predetermined null value.

9. The method of claim 6, wherein updating the data structure includes updating the at least one sort key value of the target record.

10. The method of claim 1, wherein the one or more sort criteria values identify, based on the at least one sort key value, at least one of: a maximum record, a minimum record, a least frequently used record, or a least recently used record.

11. The method of claim 1, wherein the operation comprises pushing a new record into the first plurality of records according to a stack pointer, and wherein updating the data structure comprises updating the stack pointer.

12. The method of claim 1, wherein:
    updating the data structure is a blocking operating; and
    no other database operations are performed until the updating the data structure is completed.

13. A data storage device, comprising:
    registers; and
    a controller configured to:
        receive a request to perform an operation with respect to a determined table among a plurality of database tables;
        access a data structure comprising a first plurality of records each storing:
            a table identifier value corresponding to one of the plurality of database tables, wherein the table identifier value is stored in the registers; and
            at least one sort key value; and
        perform the operation using one or more sort criteria values, wherein the one or more sort criteria values are maintained for the determined table using the at least one sort key value of the first plurality of records corresponding to the determined table,
    wherein:
    the plurality of database tables correspond to multiple databases;
    the data structure is different from the plurality of database tables;
    the first plurality of records are different from the plurality of database tables;
    a second plurality of records store the one or more sort criteria values;
    the second plurality of records are different from the first plurality of records;
    the one or more sort criteria values in the second plurality of records are determined from the at least one sort key value in the first plurality of records;
    the one or more sort criteria values in the second plurality of records are different from the at least one sort key value in the first plurality of records;
    the one or more sort criteria values in the second plurality of records comprise one or more of record identifier values;
    each record in the first plurality of records is identified by a respective record identifier value;
    the record identifier values are sequential; and
    the first plurality of records are indexed by the record identifier values.

14. The data storage device of claim 13, wherein the controller is further configured to update the data structure to reflect the performed operation.

15. The data storage device of claim 13, further comprising a memory, and wherein the controller is configured to access the at least one sort key value in the memory.

16. The data storage device of claim 13, wherein the controller is configured to perform the operation by accessing a target record of the first plurality of records using the one or more sort criteria values and without scanning the data structure.

17. The data storage device of claim 13, wherein the controller is configured to maintain the one or more sort criteria values to identify, based on the at least one sort key value, at least one of: a maximum record, a minimum record, a least frequently used record, or a least recently used record.

18. A non-transitory machine-readable medium including machine-executable instructions thereon that, when executed by a processor, perform a method comprising:
  receiving a request to perform an operation with respect to a selected logical table of a plurality of logical database tables;
  accessing a data structure comprising a first plurality of records each storing:
    a logical table identifier value corresponding to one of the plurality of logical database tables, wherein the logical table identifier value is accessed from a register; and
    at least one sort key value;
  performing the operation using one or more sort criteria values, wherein the one or more sort criteria values are maintained for the selected logical table using the at least one sort key value of the first plurality of records corresponding to the selected logical table, wherein the one or more sort criteria values identify, based on the at least one sort key value, at least one of: a maximum record, a minimum record, a least frequently used record, or a least recently used record; and
  updating the data structure to reflect the performed operation,
wherein:
  the plurality of logical database tables correspond to multiple databases;
  the data structure is different from the plurality of logical database tables;
  the first plurality of records are different from the plurality of logical database tables;
  a second plurality of records store the one or more sort criteria values;
  the second plurality of records are different from the first plurality of records;
  the one or more sort criteria values in the second plurality of records are determined from the at least one sort key value in the first plurality of records;
  the one or more sort criteria values in the second plurality of records are different from the at least one sort key value in the first plurality of records;
  the one or more sort criteria values in the second plurality of records comprise one or more of record identifier values;
  each record in the first plurality of records is identified by a respective record identifier value;
  the record identifier values are sequential; and
  the first plurality of records are indexed by the record identifier values.

19. The non-transitory machine-readable medium of claim 18, wherein performing the operation accesses a target record of the first plurality of records using the one or more sort criteria values, and wherein updating the data structure includes updating the at least one sort key value of the target record.

20. A system, comprising:
  a hardware processor configured to receive a request to perform an operation with respect to a selected logical table of a plurality of logical database tables,
  wherein the hardware processor is configured to access a data structure comprising a first plurality of records each storing:
    a logical table identifier value corresponding to one of the plurality of logical database tables, wherein the logical table identifier value is accessed from a register; and
    at least one sort key value;
  wherein the hardware processor is configured to perform the operation using one or more sort criteria values, wherein the one or more sort criteria values are maintained for the selected logical table using the at least one sort key value of the first plurality of records corresponding to the selected logical table; and
wherein:
  the plurality of logical database tables correspond to multiple databases;
  the data structure is different from the plurality of logical database tables;
  the first plurality of records are different from the plurality of logical database tables;
  a second plurality of records store the one or more sort criteria values;
  the second plurality of records are different from the first plurality of records;
  the one or more sort criteria values in the second plurality of records are determined from the at least one sort key value in the first plurality of records;
  the one or more sort criteria values in the second plurality of records are different from the at least one sort key value in the first plurality of records;
  the one or more sort criteria values in the second plurality of records comprise one or more of record identifier values;
  each record in the first plurality of records is identified by a respective record identifier value;
  the record identifier values are sequential; and
  the first plurality of records are indexed by the record identifier values.

* * * * *